Dec. 12, 1944.                N. DOUGLAS                2,364,957
                        ELECTRICAL SURVEYING
                        Filed Aug. 8, 1939        5 Sheets-Sheet 5

INVENTOR
Norvel Douglas
BY
Pennie, Davis, Marvin and Edmonds.
ATTORNEYS

Patented Dec. 12, 1944

2,364,957

UNITED STATES PATENT OFFICE 2,364,957

ELECTRICAL SURVEYING

Norvel Douglas, New Rochelle, N. Y., assignor to Stanolind Oil and Gas Company, Tulsa, Okla., a corporation of Delaware Application August 8, 1939, Serial No. 288,912

9 Claims. (Cl. 175—182)

This invention relates to apparatus for and methods of signalling between two or more points separated at least in part by the earth or a portion thereof. The invention is especially applicable to the transmission of signals related to the nature of geological strata below the surface of the earth or subsurface conditions and consequently pertains to geological surveying.

This application is a continuation in part of my application Serial No. 257,277, filed February 20, 1939.

Electrical surveying, especially in connection with bore holes drilled for oil, gas or mineral deposits, has already become of great practical value, because it furnishes information as to the nature of the changes in geological structure by taking electrical measurements while one or more electrodes are lowered into or withdrawn from a bore hole. Such a process is much quicker and cheaper than the method known as coring, which comprises withdrawing from the bore hole samples of the strata traversed by the drill.

It is well recognized that measurements which necessitate the suspension of drilling operations and usually the removal of the drilling tools from the bore hole are much more expensive and involve a much greater loss of time than with similar measurements made without removal of the drilling tools, and in fact made simultaneously with the drilling operation. One of the most important advantages of obtaining such measurements simultaneously with the drilling, as with the present invention, is that the driller and geologist are notified immediately when the drill passes from strata of one nature to strata of another nature, thus enabling the bore hole to be drilled to the optimum depth in view of the nature of the strata, and to avoid, for example, the possibility of running through an oil-bearing stratum into a water-bearing stratum which would probably contaminate the oil. Since each different earth stratum usually has its own properties and electrical characteristics, the present invention makes possible the accurate correlation of earth strata as the result of surveys in several bore holes.

Although a few systems have been proposed for making certain electrical measurements in bore holes while the drilling is in progress such methods have involved the extension of an insulated electrical conductor from the surface of the earth down the bore hole usually inside of the drill pipe to an electrode on or near the drill bit. The apparatus involved included a source of current and indicating apparatus located at the earth's surface and suitably connected to said insulated conductor and to an electrode grounded in the surface of the earth. The difficulties involved in installing and maintaining such insulated conductors in operable condition have discouraged the use of this method.

In another system it has been proposed to eliminate the insulated electrical conductor above mentioned, and employ the entire drilling tool as one electrode, and a remote surface ground as the other electrode. Electrical measurements are then made between the two electrodes by a combined current source and measuring apparatus above the earth's surface. I have found, however, that such a system is not as practicable as the system of my invention because in the prior system the drilling tool is in electrical contact with the earth through the drilling mud for substantially the entire length of the drilling tool and for this reason the indications or records made by the measuring apparatus necessarily comprise the resultant electrical effect caused by all of the strata traversed by the drilling tool. In such a system, the deeper the drill bit penetrates into the earth the less of the total current flows between the earth and the drill bit, and consequently the less the record is representative of the geological structure in the immediate vicinity of the drilling bit at the bottom of the bore hole.

It is the purpose of the present invention to make possible the indication or recording of the nature of changes in geological structure traversed by a bore hole or the conditions pertaining to the drilling operations simultaneously with the drilling operation, with at least the accuracy provided by presently employed processes which require the withdrawal of the drilling tool from the bore hole before the measurements can be made. To this end the invention provides in one embodiment a completely self-contained power source and signal generator within the drilling tool near the drill bit, this generator being connected to an electrode secured at or near the drill bit and to the drill pipe, such electrode being electrically insulated from the drill pipe.

A large number of improvements and advantages introduced by the present invention will become clear upon consideration of the following specification, and by reference to the drawings wherein:

Fig. 4 illustrates the lower end of a drilling tool constructed in accordance with the present invention, and is an outside view showing the relative arrangement of parts;

Fig. 5 and Fig. 5a together represent a vertical cross-section through a drill collar constructed in accordance with this invention to contain the signal generating apparatus;

Figs. 6, 7 and 8 are transverse sectional views taken at the corresponding points indicated by the arrows on Fig. 5 and Fig. 5a;

Figure 1:
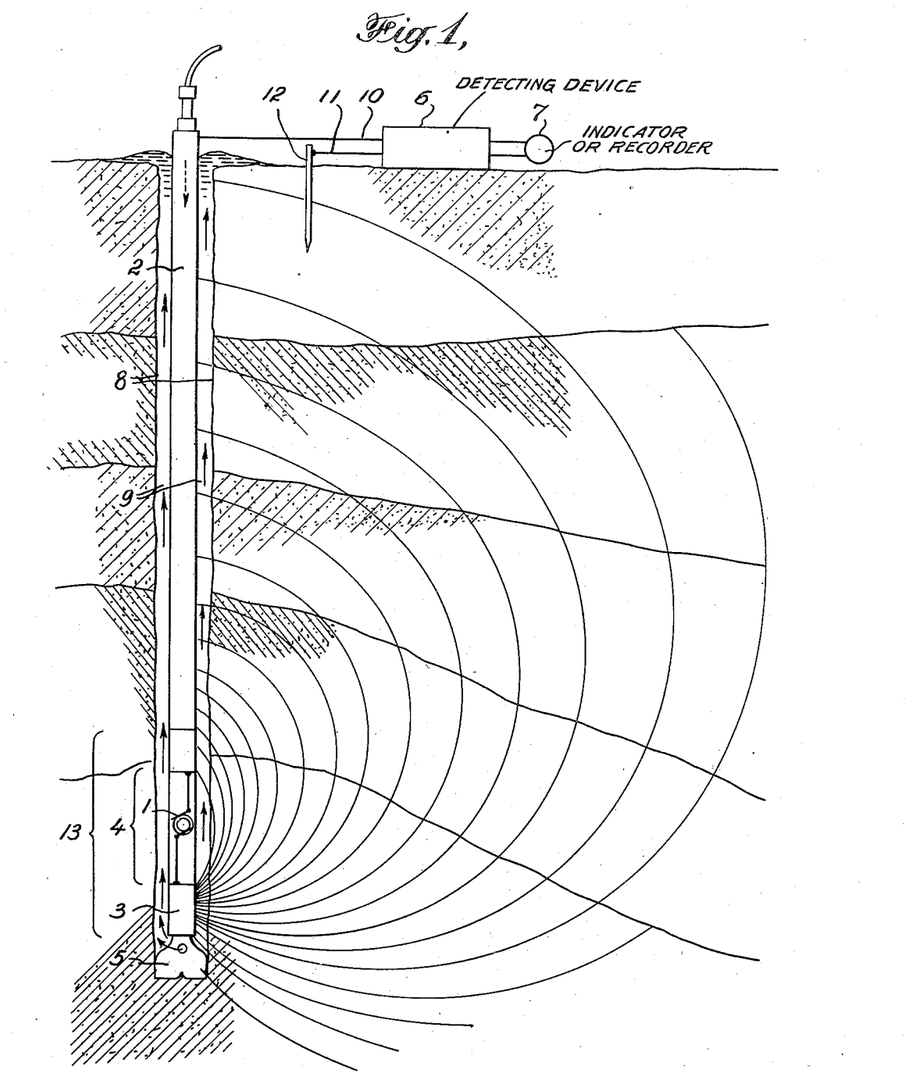
Fig. 1 is a vertical section through a bore hole in the earth, showing schematically the general arrangement of apparatus in accordance with the invention, and is similar to the drawing in my said prior application.
Figure 2:
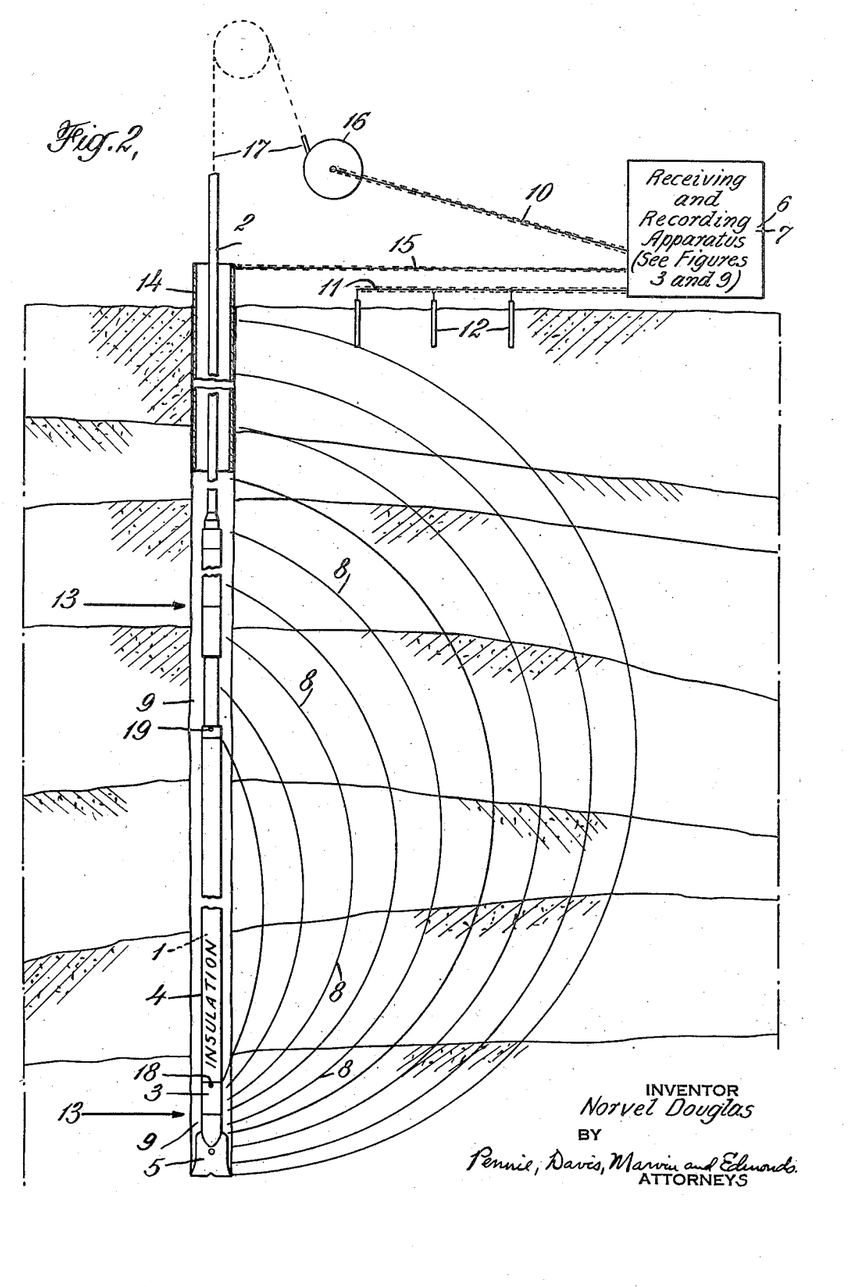
Fig. 2 is a sectional view similar to that of Fig. 1 but illustrating the apparatus in more detail.

Referring first to Figs. 1 and 2 there is shown a bore hole 9, assumed to be filled with drilling mud, in which is inserted a drilling tool comprising a drill pipe 2, near the bottom end of which is a drill collar, in accordance with this invention, between the points 13 and ending with a drill bit 5 secured to the bottom of the drill collar. Within the drill collar is a source of signal energy such as a signal-generating oscillator 1. This signal generator may derive its prime energy in any suitable manner, as, for instance, from an electric battery. If the batteries are of the dry-cell type the signal generator unit will be completely self-contained, and especially if it is controlled by the automatic switching arrangement later to be described, the batteries will probably operate for several weeks without renewal.

One terminal of signal generator 1 is connected to the drill pipe or the equivalent 2 which extends upwardly to the surface of the earth and is in contact with the earth through the drilling mud substantially throughout its length. The other terminal of the signal generator is connected to part 3 which is at the lower end of drill collar 13, to which the drilling bit 5 is connected. Parts 3 and 5 are electrically insulated from the remainder of the drilling tool by an insulating joint contained in the drill collar 13. Parts 3 and 5 make contact with the sub-surface formations 8 by virtue of the direct contact of the drilling bit 5 on the formations and by means of the drilling fluid which fills the bore hole. This drilling fluid which is used with rotary drilling tools is discharged from the interior of the drill pipe through orifices in drill bit 5, and flows to the surface of the earth in the space 9 between the drill pipe and the surface of the bore hole.

In addition to the insulating joint, electrode 3 is electrically separated from the uninsulated surface of the drill pipe 2 by an insulating cover or surface 4 which covers most of the length of the drill collar 13. This insulating cover which may be of rubber or Bakelite should be of sufficient length (about 10 feet, for example) to assure that nearly all of the potential drop in the earth surrounding electrode 3 which results from current flowing therefrom into the earth, occurs within a distance from electrode 3 which is less (say, 5 feet) than the length of the insulated portion 4 of the drill collar surface. One or more drill collars of the usual type would ordinarily be coupled between the special collar just described, and the drill pipe. The oscillators comprising signal generator 1 are described in detail in connection with Fig. 9. Briefly, they should be of a type in which the normal oscillation frequency will vary in response to changes in geological characteristics or conditions pertaining to the drilling operations in the vicinity of the electrode to which the oscillators are connected.

To complete the electric circuit between the receiving and recording apparatus and the signal generator an earth connector, such as ground electrodes 12, is sunk in the surface of the earth a suitable distance from the well, usually at least 100 feet, and connected by a shielded wire 11 to the receiving apparatus. The other connection of the receiving apparatus should be effectively connected to the drill pipe, which thereby effectively becomes a grounded electrode or terminal, as shown in Fig. 1, although because of the difficulty of making a direct electrical contact to a rotating drill pipe it has been found preferable to make a connection through the hoist cable, as at 16 in Fig. 2, by means of a shielded conductor 10. The connection to the hoist cable may be made to the draw works, as shown, or to the dead-end of the hoist cable. Another satisfactory means for effectively connecting the receiving apparatus to the upper end of the drilling tool is shown in Fig. 2 where a shielded conductor 15 is connected to the well casing 14. If desired, both connections 10 and 15 may be used, as shown in Fig. 2. The purpose of the shielded conductors is to reduce pick-up from stray electric fields such as alternating-current power lines. The apparatus which receives and records the signals by which the changes in subsurface conditions, or geological formations or structure traversed by the bore hole, are indicated or recorded is represented schematically at 6, 7 in Figs. 1 and 2. The preferred elements of such apparatus are indicated schematically in Fig. 3 which will now be described.

Figure 3:
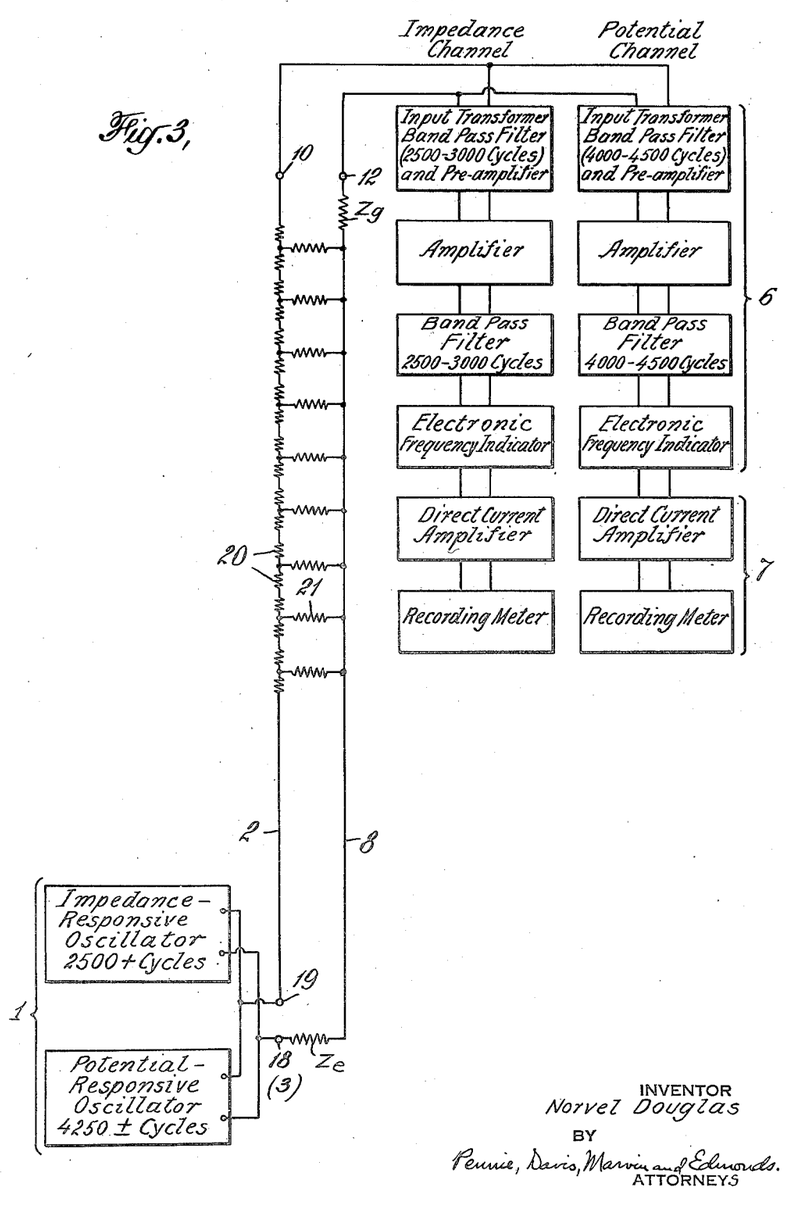
Fig. 3 is a block diagram identifying the apparatus represented in Fig. 2 and partly in Fig. 1, including the equivalent circuit connections between the signal generator and the receiving and recording apparatus.

Fig. 3 shows in schematic form an equivalent electrical circuit diagram of an entire system in accordance with the present invention as represented in Figs. 1 and 2. In this diagram the signal generator 1 comprises two oscillators, one responsive to changes in electrical impedance, and the other responsive to changes in electrical potential. These oscillators are connected through suitable coupling devices to two terminals 18 and 19, terminal 18 being connected to the electrode 3 and terminal 19 being connected to the drill pipe 2. Drill pipe 2 and the upper part of drill collar 13 may be represented electrically by a series of impedances 20 connected between terminal 19 and conductor 10. Each of these impedances may be assumed to have a value of one-half the impedance per linear foot of drill pipe. The entire earth, including the strata 8, because of the enormity of its cross-section is represented electrically by a conductor having no impedance. The impedance of the electrode 3 to earth is represented by impedance $Z_e$ represented as connected between terminal 18 and the earth 8. The impedance to earth of ground electrode 12 is represented in the diagram by impedance $Z_g$. Inasmuch as drill pipe 2 is uninsulated throughout its length and thus is connected to the earth through the drilling fluid in the bore hole (if any), its connection with the earth is represented electrically by shunt impedances 21, each of which may be assumed to have a unit value of impedance per linear foot of drill pipe to earth.

The detecting or receiving apparatus and the recording apparatus is represented schematically in Fig. 3 as comprising two channels, one of which is adjusted to respond only to frequencies over a band of say about 2500 to 3000 cycles and the other only to a band of about 4000 to 4500 cycles. The lower frequency band may, for example, be arranged to record changes in effective impedance in the earth strata, and the higher frequency band may be arranged to record electrical potential differences occurring in the earth strata.

Each of the channels of the receiver proper may preferably include an input transformer, band-pass filter tuned to pass the frequencies of the corresponding signal generator only, and a pre-amplifier, followed by another suitable amplifier, a second band-pass filter tuned to the same frequency band, an electronic frequency indicator, a direct-current amplifier and a recording meter, all coupled in the order recited.

The input transformer has a variable primary winding, adjustable by taps, so that the impedance of the transformer can be matched to the low impedance (say 1 ohm or less) of the earth circuit between points 10, 12, Fig. 3. The secondary has a very high impedance (say 200,000 ohms), and thus a high step-up in signal voltage is obtained in the transformer. It is apparent that the impedance $Z_g$ of the surface ground electrodes 12 should be kept low (preferably 1 ohm or less) so that the maximum voltage ratio can be obtained in the transformer. One purpose of the band-pass filter is to pass the frequency of the corresponding signal generator and to exclude the frequency of the other signal generator (or generators) and extraneous electrical noise of other frequencies. The band-pass filter also prevents comparatively low-frequency noise at voltages high compared with the signal from overloading the first vacuum tube amplifier.

The pre-amplifier, which is a high gain amplifier (about 60 decibels) and the entire battery supply as well as the above-mentioned input transformer and band-pass filter are preferably contained in a well-shielded box to prevent pick-up from extraneous electrical fields such as alternating current supply lines. The vacuum tubes in the pre-amplifier should be mounted on flexible supports to prevent vibration of the amplifier from causing microphonic effects. This is necessary as the acoustical noise level around a drilling well is very high.

Following the pre-amplifier is a high gain amplifier (about 90 decibels) of conventional design such as the General Radio Company type 814-A amplifier. With about 150 decibels gain in the two amplifiers mentioned, the noise due to thermal agitation in the grid and plate circuits of the first tube in the pre-amplifier becomes very large in the final amplifier stage and the purpose of the band pass filter following the final amplifier is to reduce this noise and maintain a high signal-to-noise ratio. The electronic frequency indicator represented in the diagram was of the type known as General Radio Company 834-A—Electronic frequency meter. The output of this instrument is a pulsating direct current and a suitable direct current amplifier such as the General Radio Company type 715-A, is required to amplify the current sufficiently to operate a suitable recording meter. A satisfactory recording meter for the purpose of this invention is known as the Esterline-Angus Company Graphic Meter, type 715-AE.

Referring now to Figs. 2 and 3, the operation of the apparatus in accordance with the present invention is as follows: Assuming that the impedance-responsive oscillator normally generates an alternating current of say 2500 cycles when a high value of impedance is connected across its terminals, its frequency will be increased as the value of the impedance across its terminals decreases. When the drilling tool descends in the bore hole as the drilling proceeds, the frequency of the impedance-responsive oscillator will effectively be determined by the impedance between terminals 18, 19. This impedance is the sum of the impedance $Z_e$ to earth of electrode 3 and drill bit 5 and the impedance to earth of the entire drill pipe 2. Both of these impedances will vary due to the difference in impedance of the geological strata traversed by the bore hole, but due to the very large size of the drill pipe 2 and its large area of contact with the earth the impedance of the drill pipe 2 will be extremely low (say one percent to one-hundredth of one percent) in comparison to the impedance of electrode 3 and drill bit 5. Therefore, the frequency of the impedance-responsive oscillator will be determined practically entirely by the impedance to earth of electrode 3 and drill bit 5. The impedance to earth of electrode 3 and drill bit 5, is determined partly by the impedance of the drilling fluid in the hole and to a much larger extent by the impedance of the geological strata within a few feet (say 5) of the electrode 3 and drill bit 5. The current of varying frequency in the earth circuit established by the oscillator between electrode 3 and the drilling tool above insulated portion 4 thereof establishes a potential difference in the earth circuit which can be detected or received between suitable connections at the surface of the earth. One of these connections is the upper end of the drill stem 2 and the other is ground conductor 12. As shown in Fig. 3, the earth circuit and the drilling tool above the electrode can be considered as an electric transmission line comprising series and shunt impedances reducible to a succession of equivalent T-networks.

The receiving channel in which changes of impedance are indicated is connected as shown in Fig. 3 between the two terminals at 10 and 12 of the transmission line. In this apparatus the signals from the oscillator are passed through a band-pass filter which selects and passes signal frequencies only of the band transmitted from the impedance-responsive oscillator, and are then amplified in the pre-amplifier. These signals are next amplified in a second amplifier and passed through a second band-pass filter having essentially the same characteristics as the first filter. The amplified and selected signals then actuate an electronic frequency indicator which, if desired, may give a visual indication responsive to change of frequency at the input thereof. Since the change in frequency is, in this system, proportional to the change in earth impedance in the vicinity of the electrode in the bore hole the indications observed on this frequency indicator may be interpreted in terms of changes in earth impedance. The electrical output of the electronic frequency indicator comprises a varying direct current. Therefore, if a permanent record be desired of the changes in impedance (as is usually the case) this direct current may be amplified in a direct-current amplifier and passed into a recording meter by synchronizing the rate of travel of the strip on which the record is drawn with the rate of descent (or ascent) of the drilling tool in the bore hole. A permanent record of earth impedance in relation to bore hole depth is thus obtained. As an alternative method the recording meter may be operated at a constant speed and the impedance recorded versus time. The driller's log of depth versus time may be used to correlate the impedance log in relation to depth.

The potential-responsive oscillator and the channel which receives the signals therefrom correspond to the elements above discussed in connection with the impedance-responsive oscillator. The fundamental difference is that the potential-responsive oscillator is adjusted to oscillate normally over a frequency band separably different from the frequency band representing impedance, and therefore the band-pass filters in this receiving channel are designed to pass the band of frequencies generated by the potential-responsive oscillator. The potential-responsive oscillator, like the impedance-responsive oscillator, is connected to terminal 18 which connects to electrode 3 and to terminal 19 which comprise the effective input to the transmission line 2, 8. The potential-responsive oscillator is adjusted to have a normal frequency of say 4250 cycles when no external potential is applied to points 3, 19 and which varies in frequency in proportion to a variation of potential effectively applied at points 3, 19. Therefore, as the electrode 3 traverses changes in geological structure which are accompanied by changes in natural earth potentials such changes in potential will occur between points 18 and 19 and will cause corresponding changes in frequency of the potential-responsive oscillator, increasing or decreasing the natural frequency thereof in accordance with whether the change in potential is in one sense or the other and to a corresponding degree. In view of the foregoing description it is evident, therefore, that indications on the electronic frequency indicator and on the recording meter in the potential channel of the receiving apparatus may be interpreted in terms of changes in earth potential.

It will be clear that any other desired geological or prevailing characteristics in or near the bore hole, for example, conditions pertaining to drilling operations such as temperature, pressure of the bit on the formations, pressure of the mud in the hole, and properties of geological formations traversed by the bore hole such as temperature, capacitance and phase, may be caused to vary the frequency of an oscillator, which change in frequency in turn may be used to actuate indicating or recording devices suitably calibrated, as described above.

Figures 4, 5:
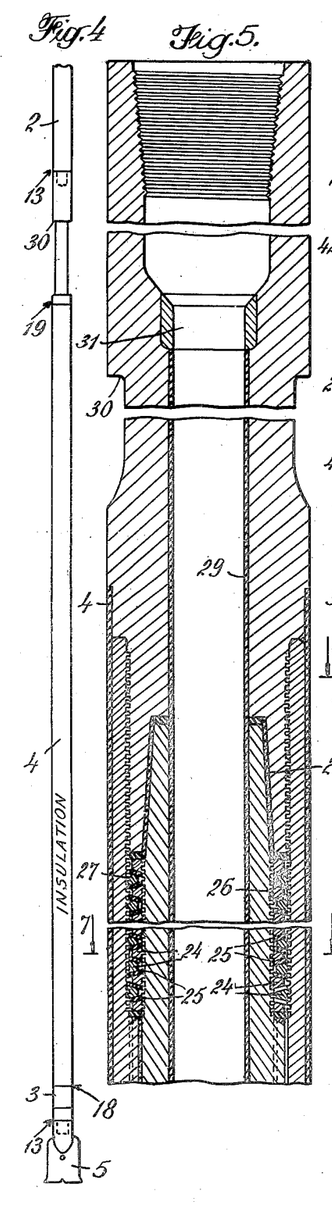

The drill collar, already referred to, is represented between the points 13 in Figs. 2 and 4. In its preferred construction, in accordance with the present invention, it is represented as comprising a hollow pipe-like member and comprising several component parts securely fastened together. In general, the collar comprises two metallic portions, insulated from each other by a special insulating joint later to be described, and enclosing an instrument chamber of generally cylindrical shape and having inner and outer concentric walls. The central passage within the inner wall constitutes a duct connecting drill pipe 2 and drill bit 5, and through which tools and drilling fluid may pass. On the upper end of the collar is provided a recess 30 for elevator tools, and above the recess is a surface shaped to accommodate pipe tongs. Near the lower end of the drill collar is an exposed metallic portion 3 which comprises part of an electrode structure, the remainder of which is the drill bit 5. Hence, in the illustrated embodiment, the effective electrode comprises both the drill bit 5 and the electrode surface 3 of the collar itself.

Although the drill bit alone may comprise the electrode, it is preferable to include also some surface on the adjacent collar to provide a sufficiently large electrode surface as well as a metal surface to which tools may be applied, and also to reduce the effect on the calibration of the apparatus due to changes in the size of the drill bits. It is important that the effective electrode be large enough because, the larger it is the lower will be its impedance to earth (other factors being constant), and the higher will be the signal voltage available at the surface. Furthermore, the larger the electrode the more nearly will its apparent impedance be determined by the specific impedance of the strata being penetrated, and the less will be the effect of the drilling fluid in the bore hole on the measurements or indications. However, if the electrode is too large it will be insensitive to changes in impedance or potential produced by penetration of thin strata. In practice an electrode having an effective length of 2 or 3 feet has been found satisfactory, although one of 5 or more feet is sometimes desirable.

Inasmuch as the drill collar must be capable of withstanding extremely heavy loads in torsion, compression and tension, a satisfactory insulating joint is difficult to design. No available insulating material is as strong as steel and most insulating materials are strong only in compression. Therefore, the insulating joint is designed so that all insulating material is under compression regardless of the type of stress applied to the collar as a whole. To this end a novel construction is employed in which two sections are used, each to handle a distinct component of the total mechanical load on the collar. For insulating material a fabric-base Bakelite has been found satisfactory, although other dielectric materials could be employed.

Figures 5A, 6, 7, 8:
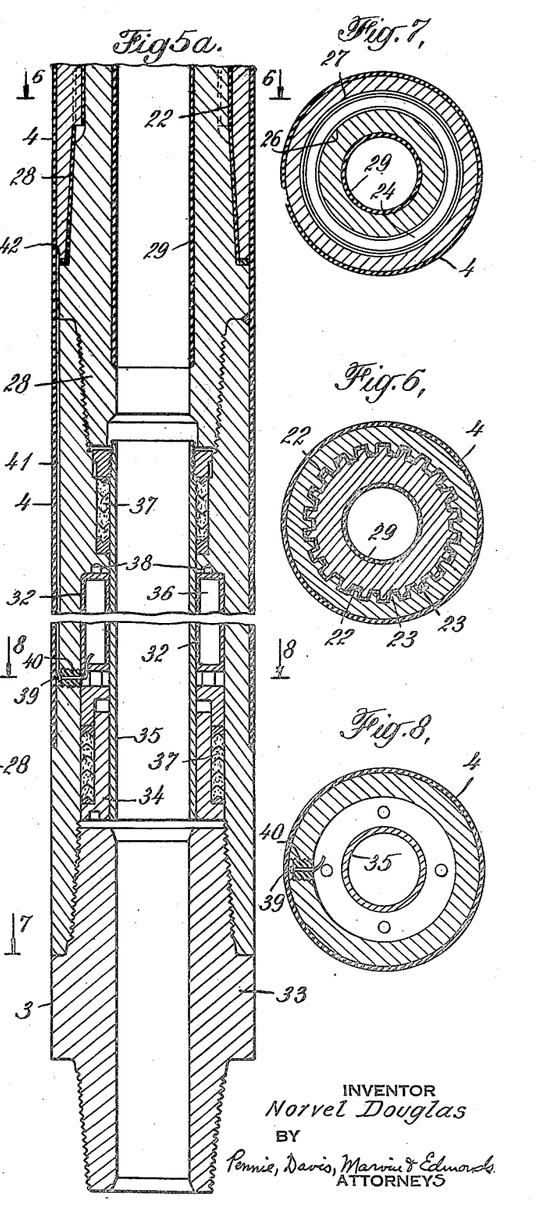

Referring to Figs. 5 and 5a, the portion of the collar through which the cross-sectional view shown in Fig. 6 is taken is constructed similarly to a spline joint, except that the insulation 22 fills the spaces between the metal teeth 23. This section of the joint puts the insulation under compression when the collar is subjected to torsional stress.

In another section the insulation is placed under compression when either tension or compression is applied to the drill collar. This is accomplished through the medium of overlapping steel rings 24 with insulating washers 25 between. The rings 24 are screwed alternately to the inner 26 and the outer 27 steel tubes of the joint so that the joint is locked. As shown, the steel and insulating rings are tapered to add rigidity to the section.

At either end of the joint, of which the tension and compression and torsion sections are in the center, tapered sections 28 provide rigidity and a coupling in which the greatest cross-section of steel can be obtained.

It may be observed that the insulation is used longitudinally in the joint, and hence by making the sections long enough any desired factor of safety as to mechanical strength of insulation may be had. The strength of the joint depends, in addition, on making all the component parts fit together very tightly and providing sufficient cross-section of steel in the joint.

The insulating joint above described would not usually provide sufficient length of insulation to insulate the electrode from the remainder of the drilling tool, because the drilling fluid both inside and outside of the collar forms a low-impedance path around the joint. It is therefore necessary to provide surface insulation both inside and outside of the collar. The outside insulation may comprise an insulating sheath 4 preferably of rubber vulcanized to the steel in order to withstand abrasion of the drilling mud. The inside surface insulation may conveniently comprise a tube of Bakelite or rubber 29. The total apparent impedance of the electrode to the adjacent geological formation includes the shunt effect of the impedance of the interior and exterior columns of drilling fluid subtended by these two insulating cylinders. Drilling fluid is usually lower in impedance than the surrounding formations and sometimes is as low as a few tenths of a meter-ohm. It is therefore desirable that these surface insulators be long enough so that the effective shunt impedance for very low-impedance drilling muds is not less than two or three times the normal impedance of the electrode in the absence of the shunting effect of the mud and drilling fluid.

On the inside of the collar a pressure tube 35 serves to form an hermetically sealed chamber 36 for the instrument rack or cylinder 32. Access to chamber 36 is obtained by removing lower sub 33 and pressure tube head 34 with a spanner wrench. Instrument cylinder 32 contains and supports the signal generator apparatus, and its power supply. Pins 38 secured to instrument cylinder 32 fit into suitable holes to prevent the instrument cylinder from turning. Packing rings 37 are compressed at each end of the instrument chamber to seal the same against hydraulic pressure.

The vacuum tubes contained in instrument cylinder 32 should be supported therein so as to prevent damage due to mechanical shock and vibration. It is also desirable that the entire instrument cylinder itself be resiliently supported within the instrument chamber. A lead-in 39 which passes through an insulating bushing 40 serves to connect the signalling apparatus through insulated connecting wire 41 to the point 42 which, in turn, is mechanically and electrically connected to the drill pipe. Electrical connection to the electrode 3 is made by contact of the instrument cylinder 32 with instrument chamber 36, a suitable connection from the signalling apparatus being made to the instrument cylinder.

While the foregoing description of the insulated drill collar represents a preferred embodiment, various modifications in construction may obviously be made without departing from the spirit of the invention. The fundamental requirements are the provision of a sufficiently strong drill collar which will provide a chamber to house and protect the transmitting or signalling apparatus, sealed against hydrostatic pressure, and to which may be attached a suitable electrode insulated from the remainder of the drill collar and drill pipe. For example, a modification which has the advantage of simplicity and cheapness is the elimination of the insulating joint. If the external surface of such collar be insulated by a sheath as shown at 4 in Fig. 2, such as rubber or Bakelite for a distance of say 10 feet, a metallic electrode, such as 3 of Fig. 2, may be secured around the outside of the insulated sheath midway its ends (instead of at one end as shown in Fig. 2), but preferably countersunk in the insulated sheath. The signal generator within the collar will then be connected between the metallic structure of the collar and the insulated electrode. With such construction the drill bit is not a part of the electrode, and the point of measurement is at the electrode, several feet above the drill bit. This is a disadvantage in some types of work, but not in others.

If in a particular instance there is no requirement for a large hole in the center of the drill collar through which core barrels or other tools may be operated, the instrument chamber may be located in the center of the collar leaving one or more passages around the chamber for the circulation of the drilling fluid.

While the above description relates to the use of the invention with rotary drilling tools, the invention may be applied as well to the cable type or spudder drilling rig, in which case the oscillators may be contained in the spudding tool and the steel cable supporting the tool in the bore hole may be used to complete the transmission circuit from the tool to the recording equipment on the surface. In addition, the invention is advantageously applicable to hydraulic drilling methods, which are similar to the rotary drill except that the pipe and bit are not rotated. Also the invention can be used with earth boring tools in which water is not circulated and the hole remains dry, for it is not essential with the present invention that the uninsulated drilling tool which extends to the surface of the earth be in contact with the earth. It is essential, however, that the electrode in the bore hole be in contact with the earth, and when the bit is the electrode, contact with the earth is of course readily established.

Figures 9, 10:
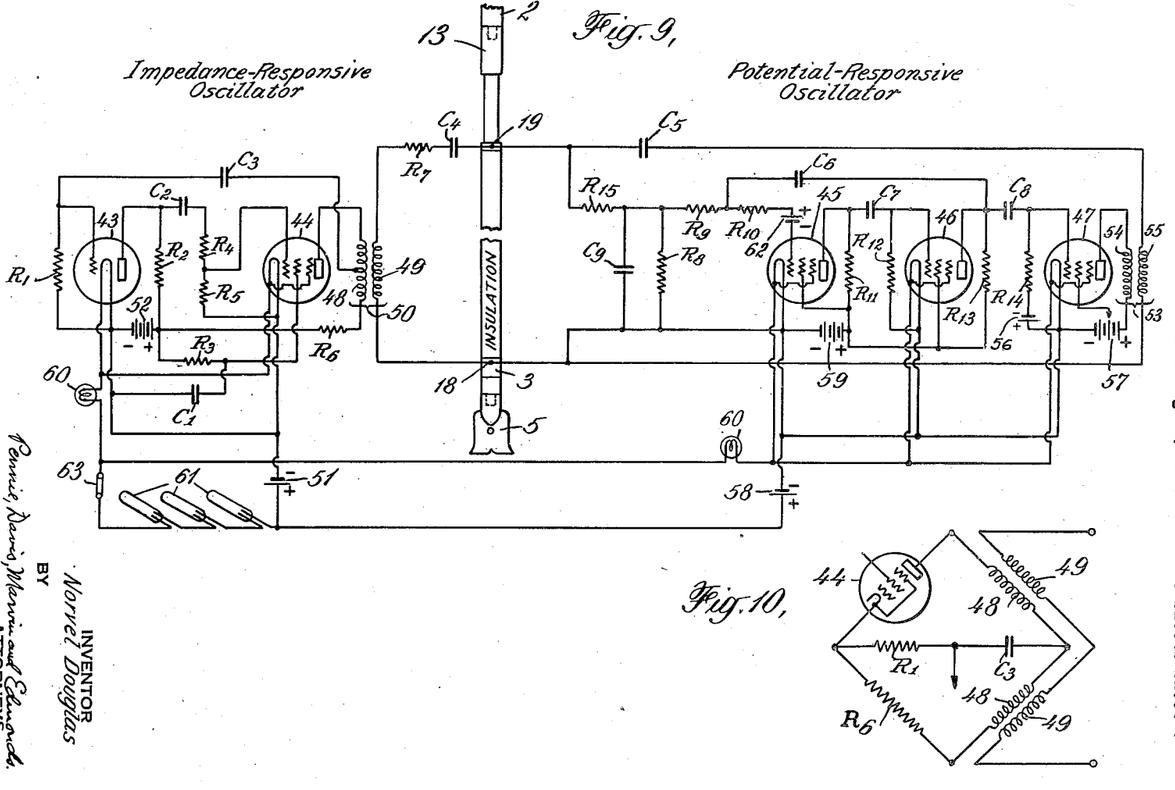
Fig. 9 is a circuit and wiring diagram of the signal-generating oscillator system more generally represented in Figs. 1, 2 and 3.
Fig. 10 is a bridge diagram of the anode circuit of tube 44 of Fig. 9.

Transmitting or signal generator apparatus to be contained in the drill collar above described and which is suitable as a part of the present invention is represented in Fig. 9. The characteristic of the transmitter which has been found to be preferable for signalling under the conditions encountered in geophysical work comprises a variation in frequency. While, of course, other signalling characteristics could be employed, such as variations in amplitude or in modulation, the use of a change in frequency to constitute signals has thus far proved to be most satisfactory. Accordingly, the signals transmitted by the two oscillators as shown in Fig. 9 comprise changes in frequency.

Referring to Fig. 9 there are illustrated two oscillators of a novel type, namely, an impedance-responsive oscillator and a potential-responsive oscillator. The impedance-responsive oscillator, as shown, includes two vacuum tubes, which, together with the circuit connections, comprise an oscillator of the type in which two resistance-capacitance-coupled amplifier stages are employed.

This impedance-responsive oscillator may comprise two vacuum tubes, a triode 43 and a pentode 44, both of which may be supplied from the same filament battery 51 and anode battery 52. The operation of such an oscillator may be explained as follows:

Assuming a small negative potential across resistance R1 which is connected between the grid and cathode of triode 43, this potential is amplified by triode 43 causing a decrease in the negative potential on the control grid of amplifier tube 44, which is a pentode. This surge is amplified by tube 44, and because of feedback through condenser C3, an increased negative potential is applied to the grid of tube 43 substantially in phase with the original small negative potential. The process continues, by virtue of the feedback being in proper phase, until the potential on the grid of tube 43 is raised to cut-off value and the tube ceases to amplify. While the grid of tube 43 has become highly negative the control grid of tube 44 has become positive, and the amplification of tube 44 has reached a maximum. The amplifier as a whole is now in a static condition and the excess charge on condenser C3 above the normal charge due to the potential of anode battery 52 starts to discharge through resistance R1 and the primary winding 48 of transformer 50. After a period determined by the circuit constants, the grid potential of tube 43 becomes less negative and the tube starts again to amplify. This causes the grid of tube 44 to become more negative, and the feedback through condenser C3 drives the grid of tube 43 more positive until it again reaches maximum amplification and the circuit again becomes static, completing one cycle of operation. This operation cycle is repeated indefinitely unless some change in or influence on the circuit takes place to produce oscillations of a different frequency.

There is no simple equation for the frequency of oscillation of such an oscillator as there is in the case of a tuned-circuit oscillator. In general, it may be said that the frequency is proportional to 1/RC, where the resistances R1, R2, R4, and R5 and the impedance of the primary 48 are proportional to R, and where the capacitances C2 and C3 are proportional to C. The frequency is also affected, of course, by the operating parameters of the tubes. Furthermore, the frequency decreases slightly with increased plate or filament voltage as well as with increased negative grid bias. The wave form of such an oscillator is not sinusoidal, but is more nearly rectangular.

By proper selection of circuit constants it is possible to obtain almost any desired oscillation frequency variation for a specified change in impedance across secondary 49 of transformer 50, this impedance being reflected as a change in load impedance in the anode circuit of tube 44. With other circuit parameters remaining constant, the frequency of the oscillator is entirely controlled by the impedance across 18, 19. In practice it has been found that the impedance of the external or earth circuit across terminals 18, 19, between the electrode 3 and the remainder of the drill stem, may vary from less than 1 ohm to as much as 40 ohms for an average size of electrode. In order that the oscillator may have a definite base frequency when there is only a few tenths of an ohm impedance effective across terminals 18, 19, a suitable resistance R7 is connected in the secondary circuit which includes terminals 18, 19. In this circuit, also, is connected a stopping condenser C4, of large capacity and preferably of a non-polarized electrolytic type, which prevents the flow in that circuit of any direct-current potentials which may be impressed across terminals 18, 19.

In an oscillator system such as that just described, the generated frequency will be directly influenced and controlled by the effective impedance across terminals 18, 19. Across these same terminals a potential at the frequency of the oscillator is also impressed, and it is this potential which causes a flow of current from the electrode through the earth strata and back to the drill pipe, as represented in Figs. 1 and 2. In the case of the impedance-responsive oscillator shown in Fig. 9, when the circuit constants below given are included, a range of oscillation frequency varying roughly from 2500 to 3000 cycles per second will be obtained if the effective impedance across terminals 18, 19 varies approximately from 1 to 40 ohms.

To obtain the greatest efficiency, the impedance of primary 48 should be of the order of magnitude of the anode impedance of tube 44, but the impedance of secondary 49 of that transformer should preferably be about 50% higher than the highest reactance of the electrode 3 to earth, so that the relation of frequency versus impedance of the electrode may be nearly linear. On the other hand if the secondary impedance is made too high the efficiency is reduced.

The impedance-responsive oscillator may employ any suitable types of vacuum tubes, but for the purpose of this invention it is preferable that they should be as small as possible and should draw a minimum of current. The type of tube known as "Hytron Bantam" has been successfully employed, tube 43 having been type HY-113, and tube 44, type HY-135. The following circuit constants are suggested only by way of example, and it should be understood that different circumstances may require different values of various components. In practice it is sometimes found that the variations in the values of certain circuit elements must not only be made, but suitable adjustments of such elements are required before satisfactory operation of the system as a whole is obtained. Therefore, with these reservations understood the following values of circuit elements are suggested:

$R_1$=0.4 megohm  $C_1$=1 mf.
$R_2$=40 M ohms  $C_2$=0.5 mf.
$R_3$=75 M ohms  $C_3$=.00015 mf.
$R_4$=0.5 megohm  $C_4$=40 mf.
$R_5$=0.5 megohm  51=1.5 volts
$R_6$=40 M ohms  52=45 volts
$R_7$=5 ohms
48=100,000 ohms (impedance) (center tapped)
49=100 ohms (impedance)

The potential-responsive oscillator shown to be connected also to terminals 18, 19 is likewise a form of relaxation type of oscillator in which the frequency is controlled in this instance by the grid bias on the tube 45. This oscillator system may include three vacuum tubes all of the same type as that of tube 44 in the impedance-responsive oscillator. The tubes are operated on filament battery 58, and tubes 45 and 46 operate on an anode battery 59, and together comprise the oscillator proper. Tube 47 is coupled to the relaxation oscillator by resistances R13 and R14 and condenser C8. In the output circuit of tube 47 is a coupling transformer 53 having a primary 54 and a secondary 55. Tube 47 preferably has its own anode battery 57. This tube 47 acts as a blocking tube to prevent variations in impedance across terminals 18, 19 from changing the frequency of the potential-responsive oscillator, and also functions as an amplifier for the output of tube 46. The amplified oscillations are coupled to terminals 18, 19 by transformer 53, and thus are established in the external transmission circuit already defined, variations in frequency which may be detected at some remote point such as the surface of the earth.

In the operation of the potential-responsive oscillator the variable part of the grid bias which controls the frequency of oscillations is supplied by the combined direct-current potential to earth of the electrode 3 and the drill pipe 2, and the fixed point of the bias supplied by the bias battery 62. Due to the very great size of the drill pipe 2 compared with electrode 3, the potential of the drill pipe does not change appreciably with change in depth and hence practically all of the direct-current potential change across terminals 18 and 19 is due to the change in potential of the electrode 3 at or near the drill bit as the electrode traverses different geological material. The operating parameters of the tubes and the value of bias potential are selected so that a small change in direct-current potential across 18, 19 will produce a relatively large change in frequency of the oscillator. Inasmuch as resistance R15 is very small in comparison with resistance R8, nearly all of the direct-current potential across 18, 19 also appears across the control grid and cathode of tube 45.

A stopping condenser C9 across the input to the potential-response oscillator should be large enough to have substantially zero impedance over the frequency bands of both oscillators, substantially to prevent alternating-current potential from being applied to the grid of tube 45, since this tube is intended to respond only to changes in direct-current potential. Resistance R15 should be large enough to introduce a high alternating-current impedance in the input to tube 45 as compared with the secondary impedance of transformer 53, in order to prevent a decrease of output from the potential-responsive oscillator. Stopping condenser C5 is connected for the same purpose as stopping condenser C4 and may be of the same type and value. It allows the passage of alternating current into the terminals 18, 19, but stops the passage of direct current through secondary 55 of transformer 53. The function of feedback condenser C6 is similar to that of condenser C3. Using circuit constants of the order of magnitude given below, the potential-responsive oscillator will generate oscillations having a frequency range of about 4000 to 4500 cycles per second when a direct current potential of from about −500 millivolts to +500 millivolts is impressed at terminals 18, 19.

Values of circuit constants suitable for the potential-responsive oscillator above described will now be given for completeness, it being understood that as in the case of the impedance-responsive oscillator these values are necessarily subject to variation, and the components to adjustment, as the circumstances may require:

$R_8$=500 M ohms
$R_9$=350 M ohms
$R_{10}$=500 M ohms
$R_{11}$=15 M ohms
$R_{12}$=400 M ohms
$R_{13}$=25 M ohms
$R_{14}$=1 meg.
$R_{15}$=1 M ohms
$C_5$=40 mf.
$C_6$=.001 mf.
$C_7$=.000075 mf.
$C_8$=.05 mf.
$C_9$=40 mf.
62=1.0 volt
58=1.5 volts
59=22.5 volts
56=1.5 volts
57=45 volts
54=100 M ohms (impedance)
55=100 ohms (impedance)

Inasmuch as the oscillations from the potential-responsive oscillator appear across the primary of transformer 50 some means must be provided to prevent this pontential from being fed to the control grid of tube 43, and undesirably affecting the impedance-responsive oscillator. Accordingly, the output circuit of tube 44 is arranged in the form of a Wheatstone bridge. This bridge connection may be more clearly seen in the circuit of Fig. 10 which is equivalent to the part of the circuit of Fig. 9 in which tube 44 is connected. Here resistance $R_6$ approximately matches the anode resistance of tube 44 and hence potential across 18, 19, does not appear across condenser C3 and resistance R1. However, the potential developed in the anode circuit of tube 44 is repeated to resistance R1 and condenser C3, as has already been pointed out.

The selection of the frequency ranges to be employed, especially in connection with bore hole surveying, is important in view of the following considerations. One element of the transmission path between terminal 19 and the receiver is the steel drill pipe. The alternating-current impedance of all conductors increases with frequency due to skin effect, and materials of high permeability increase in impedance faster than do non-magnetic materials as the frequency increases. Because of the limited space available in the drill collar for the inclusion of transmitting apparatus, an oscillator of low power is indicated, and hence if sufficient signal voltage is to be obtained at the surface when the equipment is used in deep bore holes, the attenuation of the transmission circuit must be kept low. This, again, points to the use of a low frequency. However, the frequency cannot be too low because the recording equipment at the surface responds to low-frequency metallic contact noises developed by the machinery of the drilling rig. Another source of electrical noise is direct induction and ground potential frequently picked up as harmonics from alternating-current supply lines in the neighborhood. Most such disturbing noises are at frequencies below about 1000 cycles, and practically none of them exists above 2000 cycles. For these reasons, 2000 cycles has been selected as a practical minimum for use in connection with deep-well apparatus according to the foregoing description. When the invention is employed otherwise higher, and sometimes lower, frequencies may successfully be used. In shallow wells, considerably higher frequencies may be employed.

The width of each frequency band which is to transmit signals of some characteristic or condition from the sub-strata to the surface is also an important consideration. A band of about 500 cycles in width is usually sufficient to cover the necessary range of variations of conditions or characteristics to be measured or indicated, and yet it is narrow enough so that a sufficient number of frequency bands, each relating to a different characteristic or condition, may be used simultaneously without any band's reaching such a high frequency that the attenuation in the transmission circuit becomes excessive.

Although any suitable source of electric energy for the transmitter above described may be employed, practice in the field has indicated that a satisfactory source of electric power is that obtained from small dry cells built up into batteries shaped to fit into the instrument cylinder. Such batteries will operate the transmitter for several weeks continuously.

When batteries are used as a source of electric power for the signal generator it is desirable that their life should be prolonged as much as possible. However, since the transmitting apparatus is preferably sealed hermetically within the drill collar, some means preferably operable from the outside of the collar should be provided whereby at least the filament-heating batteries may be disconnected when measurements are not actually being made. To this end several mercury switches 61 (Fig. 9) such, for example, as the General Electric Vapor Lamp Company "Kon-Nec-Tor" No. 1-15KRO, may be connected in series in the battery circuit and physically positioned in the drill collar so that the circuit through them is continuous when the drill collar is in its normal upright position and so that the circuit through at least one of them is broken when the drill collar is tipped to a considerable angle, as for example, when it is laid horizontally. If three of these mercury switches are spaced 120° apart, for example, in the instrument cylinder, each tube being mounted at an angle of 30° from the axis of the cylinder, with the mercury contact ends down and the other ends of the tubes all tipped toward the center of the cylinder, the making and breaking of the filament battery circuit may be readily controlled without access to the interior of the drill collar. When the mercury switches are thus positioned, the mercury tends to be thrown against the contacts when the instrument cylinder is rotated. An additional snap switch 63 may also be included within the instrument cylinder 32, if desired, to interrupt the filament circuit permanently, as for example, when the collar is temporarily out of service. If necessary, additional mercury tubes may be inserted elsewhere in the filament circuits to insure that the circuit to each separate battery is broken when desired. However, in the case illustrated the potentials of the filament batteries are all equal, and therefore no current will flow if the circuit is broken in the location illustrated. A ballast tube 60 is shown in series with the vacuum tube filaments to maintain the filament current constant.

I claim:

1. Apparatus for drilling bore holes in the earth and simultaneously exploring the geological formations surrounding said holes, including in combination, a drilling tool, two oscillators secured near the lower end of said tool and connected to said tool and to an electrode insulated from and secured to said tool, one of said oscillators being adjusted to oscillate over a frequency range of about 2500 to 3000 cycles and the other of said oscillators being adjusted to oscillate over a frequency range of about 4000 to 4500 cycles, each of said oscillators being variable in frequency in response to changes in a different preselected physical condition or geological characteristic in the vicinity of said electrode, oscillation-receiving apparatus remote from said oscillators and selectively responsive to the frequency ranges over which said oscillators are adjusted to vary, and circuit connections including said drilling tool connecting said oscillators and said receiving apparatus.

2. Apparatus adapted for geological exploration in bore holes extending from the surface into the earth, including in combination, a drilling tool comprising a drill collar and a drill bit, said collar serving to encase a plurality of oscillators electrically coupled to two terminals, one of said terminals being connected to an exploring electrode insulated from and secured near the end of said tool and the other terminal being connected to the portion of said tool which extends to the surface, means associated with a first one of said oscillators causing the frequency thereof to vary over a first frequency range when said electrode traverses strata having various impedance characteristics, means associated with a second one of said oscillators causing the frequency of said second oscillator to vary over a second frequency range when said electrode traverses strata having various earth-potential characteristics, and means associated with each oscillator preventing oscillating potentials generated by any of said oscillators impressed across said terminals from influencing the frequency of any of said oscillators.

3. Apparatus adapted for geological exploration in bore holes extending from the surface into the earth, including in combination, a drilling tool comprising a drill collar and a drill bit, said collar serving to encase a plurality of oscillators electrically coupled to two terminals, one of said terminals being connected to an exploring electrode secured near the end of said tool and the other terminal being connected to the portion of said tool which extends to the surface, means associated with a first one of said oscillators causing the frequency thereof to vary over a first frequency range when said electrode traverses strata having various impedance characteristics, means associated with a second one of said oscillators causing the frequency of said second oscillator to vary over a second frequency range when said electrode traverses strata having various earth-potential characteristics, means associated with each oscillator preventing oscillating potentials generated by any of said oscillators impressed across said terminals from influencing the frequency of any other of said oscillators, and means associated with said first oscillator preventing direct-current potentials impressed across said terminals from influencing the frequency of said first oscillator.

4. In apparatus for geological exploration in bore holes, including a drill pipe and an oscillator positioned near the drill bit end thereof, said oscillator having an input circuit and an output circuit, an electrode electrically insulated from and secured to said drill pipe and positioned near said oscillator, means coupling said input circuit to said electrode and to said drill pipe including means preventing alternating-current potentials on said electrode from influencing the input circuit of said oscillator, and means including a vacuum tube coupling said output circuit to said electrode and to said drill pipe to prevent alternating-current and direct-current potentials on said electrode from influencing the output circuit of said oscillator.

5. In apparatus for geological exploration in bore holes, a drilling tool including a drill collar, an electric signaling device hermetically sealed in a chamber within said collar and switch means for controlling a circuit of said device, said switch means and all connections associated therewith being contained within said collar and being operable by a force applied externally of said collar.

6. In apparatus for geological exploration in bore holes, a drilling tool including a drill collar, a vacuum tube oscillator hermetically sealed in a chamber within said collar, and means within said chamber and operable externally thereof serving to open and close a filament circuit of said oscillator.

7. In apparatus for geological exploration in bore holes, a drilling tool including a drill collar, a vacuum tube oscillator having a filament circuit and a source of current therefor hermetically sealed in a chamber within said collar, and switch means within said chamber and operable externally thereof serving to open and close said filament circuit, said switch means comprising a plurality of gravity-operated switches connected in series and arranged substantially around a circle with their axes at an angle to the axis of the drill collar.

8. Apparatus for logging a well during the course of drilling said well which includes a drill pipe, a drill bit mechanically attached to said pipe but electrically insulated therefrom, said drill pipe containing a chamber disposed in the wall of said pipe near the lower end thereof, an electric oscillator within said chamber energized only by electrical sources disposed within said chamber, said oscillator including an output transformer, means for coupling the output of said transformer between said bit and said pipe, said means constituting the sole electric connection from said oscillator to said pipe and said bit, a second electrical oscillator within said chamber energized only by electrical sources disposed within said chamber, said second oscillator including a plurality of vacuum tubes including an input tube, means for coupling a grid and the cathode of said tube directly between said pipe and said bit, whereby the voltage between said grid and said cathode varies with the natural potential in said well between said bit and said pipe, means for coupling only the alternating current output of said second oscillator between said pipe and said bit, filtering means in said direct coupling to said grid and said cathode for filtering out substantially all of said alternating current output from the input to said second oscillator, whereby said second oscillator generates alternating current at a frequency which varies with the variation in said natural potential, said electric oscillator and said second oscillator being adjusted to oscillate in different frequency bands, and means located at the surface of the earth for detecting and producing a separate visual indication of the frequency of the alternating current flowing near the surface of the earth adjacent said drill pipe due to the operation of said electric oscillator and of the frequency of the alternating current flowing near the surface of the earth adjacent the drill pipe due to the operation of said second oscillator.

9. Apparatus in accordance with claim 8 in which the coupling between said output transformer and said bit and drill pipe includes a condenser connected in series therewith, whereby the voltage drop across said coupled transformer is substantially free from any component due to said natural potential, and means connected to said transformer for substantially preventing flow of alternating current at the frequency of said second oscillator in the circuits of said electrical oscillator.

NORVEL DOUGLAS.